United States Patent [19]

Stacey

[11] Patent Number: 5,113,125
[45] Date of Patent: May 12, 1992

[54] AC DRIVE WITH OPTIMIZED TORQUE

[75] Inventor: Eric J. Stacey, Penn Hills Township, Pa.

[73] Assignee: Westinghouse Electric Corp., Pittsburgh, Pa.

[21] Appl. No.: 694,323

[22] Filed: May 1, 1991

[51] Int. Cl.⁵ .............................................. H02P 5/28
[52] U.S. Cl. .................................... 318/721; 318/254; 318/722
[58] Field of Search .............. 318/138, 254, 439, 720, 318/721, 722, 723, 724

[56] References Cited

U.S. PATENT DOCUMENTS

| | | | |
|---|---|---|---|
| 3,784,888 | 1/1974 | Geiersbach et al. | 318/138 |
| 3,908,130 | 9/1975 | Lafuze | 318/254 X |
| 4,223,261 | 9/1980 | White | 318/721 |
| 4,489,266 | 12/1984 | Franzolini | 318/800 |
| 4,651,068 | 3/1987 | Meshkat-Razavi | 318/254 |
| 4,669,024 | 5/1987 | Stacey | 361/85 |
| 4,672,556 | 6/1987 | Shepler | 364/484 |
| 4,942,344 | 7/1990 | Devitt et al. | 318/254 |

Primary Examiner—Bentsu Ro
Attorney, Agent, or Firm—R. P. Lenart

[57] ABSTRACT

Apparatus to extend the speed range and maximize torque of an ac drive by optimizing the torque angle as a function of speed. Using the back-emf of the machine, or the voltage from a permanent magnet generator mounted on the motor shaft for reference, a novel analog biasing arrangement of a fast tracking multi-phase phase locked loop generates a set of stator current reference signals having a phase angle which is programmed to provide the optimum torque angle at any speed.

11 Claims, 6 Drawing Sheets

AC DRIVE WITH OPTIMIZED TORQUE

BACKGROUND OF THE INVENTION

1. Related Application

U.S. patent application Ser. No. 07/587,190 filed Sept. 24, 1990 entitled "PMG-based Position Sensor and Synchronous Drive Incorporating Same".

2. Field of the Invention

This invention relates to ac drives incorporating a power converter which generates a multi-phase stator current phase locked to rotor position at a phase angle which is adjustable to produce optimum torque as a function of speed.

3. Background Information

Commonly owned U.S. patent application Ser. No. 07/587,190 filed on Sept. 24, 1990 discloses an ac drive in which a power electronic converter provides the multi-phase stator current for a synchronous motor. The multi-phase stator current is fed back negatively to the input of the converter which therefore acts as a current source. The converter is controlled by a multi-phase current reference voltage which is phase locked by a high resolution phase locked looped to a rotor position signal generated by a permanent magnet generator mounted on the motor shaft. This arrangement provides a rugged ac drive suitable for use in difficult applications subject to hostile environments such as aircraft starter/generators. In such an ac drive, the multi-phase stator current is phase locked at a predetermined phase angle to rotor position, typically selected to produce maximum torque. However, for a machine with fixed rotor flux, the maximum speed at which full torque can be generated is limited, and torque and power drop off rapidly at that point.

There is a need, therefore, to provide an improved ac drive incorporating a controlled current power converter in which the maximum speed obtainable can be extended beyond that presently available in such drives.

More broadly, there is a need for an ac drive incorporating a controlled current power converter in which the torque can be controlled as a function of speed.

More particularly, there is need for such an improved ac drive in which the phase angle between the stator current and the rotor position can be controlled to control torque.

SUMMARY OF THE INVENTION

These and other needs are satisfied by the invention which is directed to apparatus which extends the speed range and maximizes torque of an ac drive by optimizing the torque angle as a function of speed. The apparatus includes means generating a position signal representative of the rotational position of the rotor. This position signal is used to generate a multi-phase set of reference signals at a predetermined phase angle with respect to the position signal. The multi-phase set of reference signals is applied to a power converter which generates multi-phase stator currents also at the predetermined phase angle with respect to the position signal. Means are provided to adjust the predetermined phase angle of the set of multi-phase reference signals with respect to the position signal and, therefore, to adjust the phase of the stator currents with respect to the rotor field. This phase angle is adjusted to optimize the torque as a function of speed.

The reference signals are generated by a high resolution phase locked loop in which the predetermined phase angle between the reference signals and the position signals is adjusted by the application of a bias to the phase locked loop. More particularly, the phase locked loop includes means generating a phase error between the set of multi-phase reference signals and the position signal, means integrating the error signal, and means generating the reference signal at a value of the predetermined phase angle which drives the error signal to zero. The bias means adds a bias to the phase error signal to generate a biased phase error signal which is integrated and driven to zero by the phase locked loop.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

The invention will be described as applied to a three-phase synchronous machine. However, it will become evident to those skilled in the art that the invention could be applied to drives for other types of multi-phase ac motors, such as for instance, reluctance motors.

Figure 1:
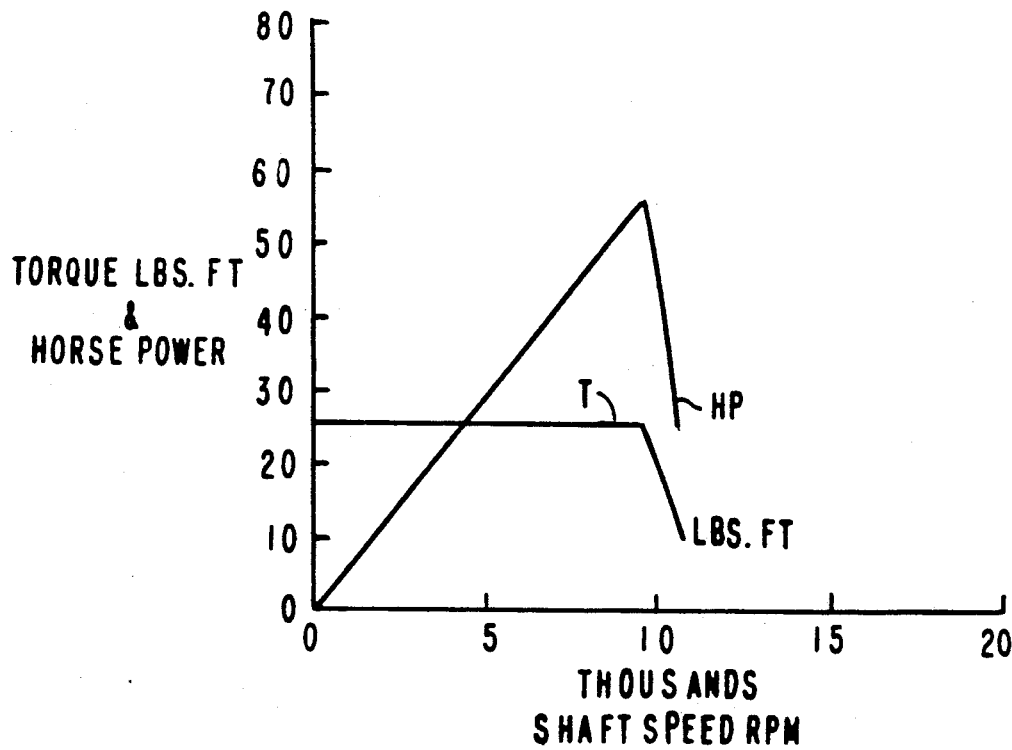
FIG. 1 is a plot of the performance of an ac synchronous drive without the benefit of the invention.

Before describing the details of specific embodiments of the present invention, it is useful to consider the principles involved. Consider an ideal synchronous machine having constant rotor flux which is fed with fixed magnitude currents. Maximum torque is produced when the phase of the current is exactly opposed by the rotor induced emf in the stator. This phase angle is fixed relative to the position of the rotor poles and holds good even at zero speed. To supply the required current, the converter must be capable of providing sufficient voltage to match the rotor induced emf and overcome the synchronous impedance. As the speed increases, the stator emf also increases and more voltage is required to maintain the amplitude of the current. Full magnitude current can be maintained up to the speed at which the voltage of the power converter supplying the current reaches its maximum level. Any further small increase in speed causes significant reductions in current and torque, and therefore the speed is effectively limited. Computer generated idealized torque and power versus speed characteristics for such an ac drive are shown in FIG. 1. As shown there, maximum voltage on the converter is reached at slightly less than ten thousand rpm, at which point the torque (T) and horsepower (HP) fall off rapidly.

Figure 2:
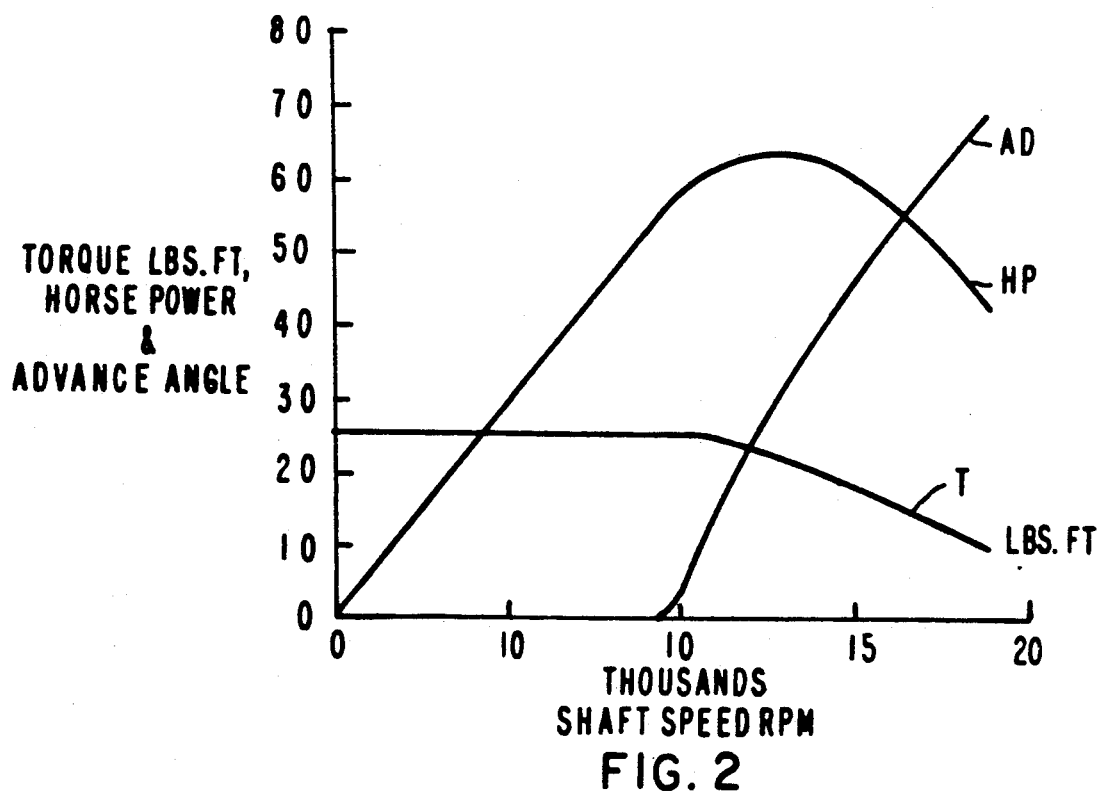
FIG. 2 is a plot of the performance of an ac synchronous drive to which the invention has been applied.

In accordance with the invention, the maximum speed of the synchronous machine is increased by advancing the phase angle of the stator current. In order to maintain the amplitude of the current while the inverter voltage is limited at its maximum level, the phase angle of the stator current can be advanced up to ninety degrees as a function of speed. Since the current is no longer exactly opposed by the emf, the torque will decrease proportionally to the cosine of the angle by which the current is advanced. To achieve the highest possible torque, the phase angle is determined by the voltage required across the synchronous reactance of the machine to maintain the current amplitude. This voltage increases proportionally to speed. While the torque begins to decrease immediately as the phase of the current is advanced, power will continue to increase until the phase of the current becomes directly aligned with the fundamental output voltage of the inverter. Beyond this point, both torque and power will decrease. For machines having fixed rotor excitation, this technique can extend the useful speed range considerably without giving up low end torque. Maximum speed is reached when the available torque decreases to match the total loading. For some applications, the maximum speed may double. Computer generated torque and power characteristics for an idealized drive operating in accordance with the invention is shown in FIG. 2. Where T is the torque, HP is the power, and AD is the phase angle advanced in degrees. Comparing FIG. 2 with FIG. 1, it can be seen that by advancing the phase angle between the stator current and the back emf of the motor, that the torque drops off much more slowly so that much higher speeds can be obtained dependent upon the load on the motor.

Figure 3:
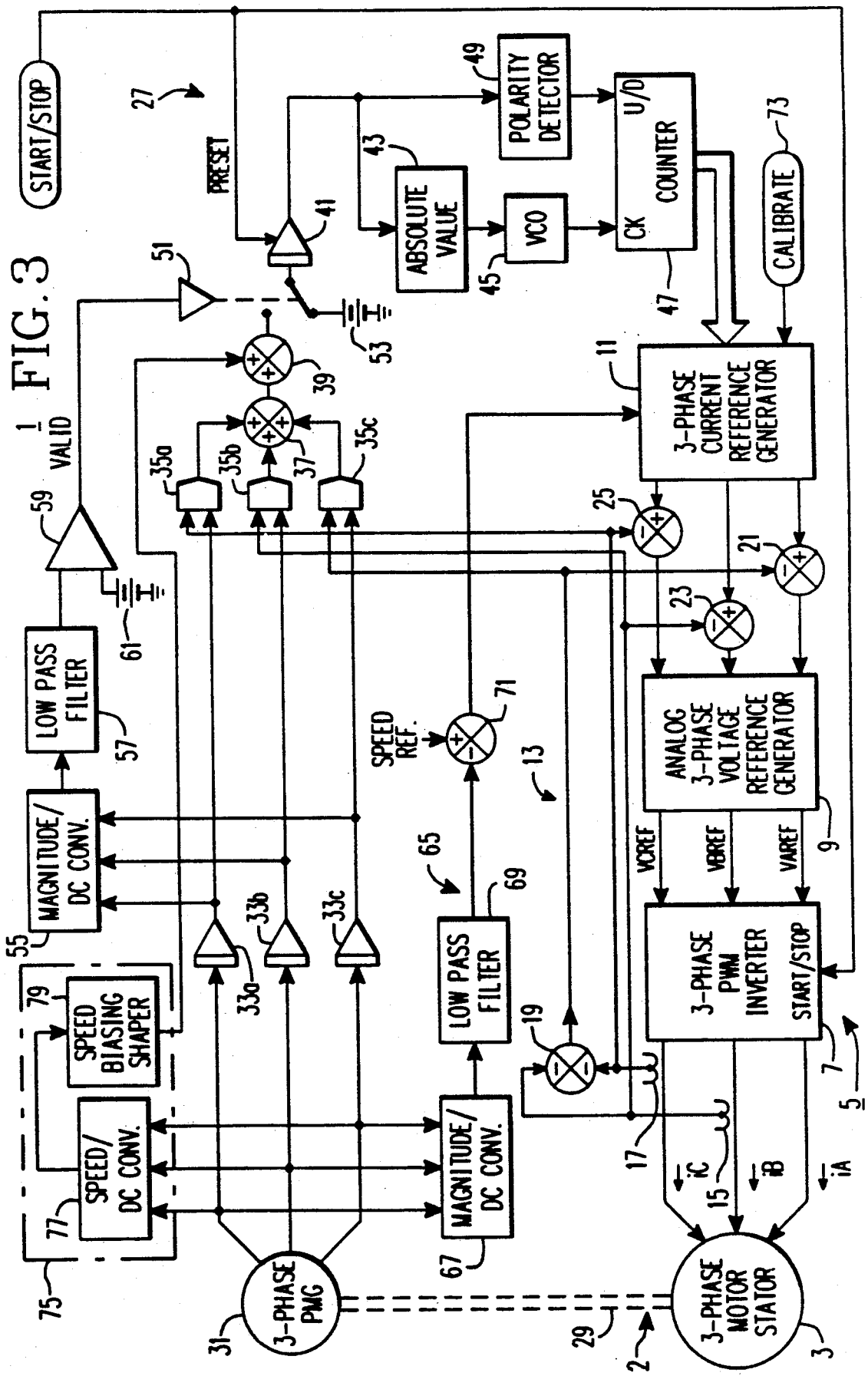
FIG. 3 is a schematic diagram of an ac synchronous drive in accordance with one embodiment of the invention.

A synchronous drive 1 employing automatic torque optimization in accordance with the invention is illustrated in FIG. 3 as implemented as part of an airborne starter/generator unit. In this application, a brushless, synchronous alternator 2 coupled to the engine serves both as a starter motor and a generator. When functioning as a generator, a dc link inverter 5 is used to convert the variable frequency output of the generator to constant 400 Hz power. When operating as a starter, the dc-link inverter 5 supplies the machine with the needed controlled current so that it develops the torque required to start the engine. To provide for excitation from zero speed on up, this machine was equipped with a special three-phase ac exciter field winding (not separately shown). This winding was designed for direct connection to a three-phase 400 Hz bus and produced counter-rotating flux in the exciter. When operating, the current in the main rotor was sufficient to cause saturation at relatively low speed and therefore, the main rotor flux was essentially constant.

Considering operation of the system 1 as a starter, various types of power converters 5 could be used to supply to the stator 3 of the motor 2. In the system disclosed, the inverter 5 is a dc link power converter which includes a pulse width modulated (PWM) voltage sourced inverter 7 with an analog three-phase voltage reference generator 9 controlled by a current reference generator 11 which generates three-phase current reference signals. A current feedback loop 13 assures that the stator currents iA, iB, iC track the three-phase current reference signals generated by the reference generator 11. The current feedback loop 13 includes current sensors 15 and 17 and summing circuit 19 which generates the third current feedback signal, and summing junctions 21, 23 and 25 which generate error signals representing errors between the feedback currents and the reference currents for application to the analog three-phase voltage reference generator 9.

The three-phase current reference generator 11 is part of a high-resolution phase locked loop (PLL) 27 which generates the three-phase current reference signals phase locked to a position signal. The position signal represents the instantaneous position of the motor rotor. As the rotor field induces the back emf in the stator, this position signal also represents the angular position of stator back emf, which as previously mentioned, determines with the stator current the torque generated by the motor.

The rotor position signal can be generated by using a commercially available resolver, encoder, or other device attached to the rotor 29 of the three-phase motor 3. In the system shown in FIG. 3, a three-phase permanent magnet generator (PMG) 31 is utilized to generate a three-phase rotor position signal. In the exemplary motor, the position signal and the stator currents are both three-phase. It is not necessary that the position signal have the same number of phases as the stator currents, as long as it is an integer multiple of the number of stator phases. The relative magnitudes of the three-phase set of voltages generated by the PMG 31 are a function of the position of the rotor 29. The magnitude and frequency of the set of voltages are proportional to speed, and, therefore, the rotor 29 must be rotating in order to initially determine its position. In order to obtain signals which remain essentially constant in magnitude over a wide range of frequencies, the output of the PMG 31 is applied to three operational integrators 33a–33c.

The phase locked loop (PLL) 27 generates the three-phase current reference signal phase locked to the three-phase position signal generated by the integrators 33a–33c. The three-phase phase locked loop 27 includes phase comparators 35a–35c which compare each phase of the analog integrated outputs of the PMG 31 to a corresponding phase of the analog three-phase current reference signal generated by current reference signal generator 11. For this purpose, the current reference signal generator 11 comprises a three-phase sign look-up table stored in the read-only memory (ROM) and a digital to analog converter. The separate analog phase error signals generated by the phase comparators 35a–c are summed in a summing junction 37 to generate a total phase error signal.

A speed bias signal is added to the phase total error signal in another summing junction 39 to generate a biased total phase error signal. This biased total phase error signal is integrated by an error integrator 41 to generate an integrated biased phase error signal. The magnitude of this integrated biased phase error signal, as derived by the absolute value circuit 43, is applied to a voltage controlled oscillator (VCO) 45 which generates a pulse signal having a variable frequency which is proportional to the magnitude of the integrated biased phase error signal. This variable frequency pulse signal is applied to a digital counter 47 which counts up or down dependent upon the sense of the integrated biased phase error signal as detected by a polarity detector 49.

The output of the counter 47 is a digital binary shaft position signal. This binary shaft position signal is used to address a three-phase sign look-up table stored in the ROM of the reference generator 11 which generates the three-phase current reference signal. The current feedback signals in the current feedback loop 13 which track the three-phase current reference signal generated by the reference generator 11 are fed back to the comparators 35*a–c*.

The phase locked loop 27 phase locks the three-phase current reference signal generated by the reference generator 11 to the multi-phase position signal generated by the PMG 31. At very low speeds, the magnitude of the multi-phase position signal generated by the PMG 31 is too low to achieve phase lock. Therefore, for start-up from zero rpm, additional circuitry is provided. An analog switch 51 replaces the biased total phase error signal with a preset fixed error signal provided by the battery 53. A start/stop signal provides a PRESET signal to the error integrator 41 which sets the initial output of the integrator which then increases due to the fixed input applied by the battery 53. The start/stop signal also initializes the pulse width modulated inverter 7. As the motor begins to turn and the PMG 31 begins to generate the analog position voltage, the output of the integrators 33*a–c* is converted into a dc signal by magnitude to dc converter 55, filtered in a low pass filter 57, and then compared in comparator 59 with a threshold signal generated by another battery 61. When the magnitude of the PMG position signal reaches the minimum determined by the comparator 59 for phase lock, a valid signal generated by this comparator actuates the analog switch 51 to replace the minimum acceleration signal provided by the battery 53 with the biased total phase error signal.

The phase lock loop 27 operates as follows. When phase locked to a forward rotating PMG 31, positive sequence waveforms are produced and the binary counter 47 counts upward. The output of the counter 47 then addresses three sets of ROM look-up tables in the reference generator 11 which generate binary representations of a three-phase set of current reference sine waves. The inverter 5 generates stator currents $i_A$–$i_C$ which track these reference sine waves. The stator currents and, therefore, the reference sine waves lead the output voltages of the ac integrators 33*a–c* by ninety degrees. In this state, the average outputs of the phase comparators 35*a–c* and the output of the summing junctions 37–39 (assuming for the moment that no bias voltage is being generated) are exactly zero, and the output of the error integrator 41 and the VCO 45 will remain constant.

If the binary count generated by the counter 47 begins to lag with respect to the phase of the ac integrator outputs, then the individual average outputs of the phase comparators 35*a–c* and the output of the summing junctions 37 and 39 become positive, causing the output voltage of the error integrator 41 and the frequency of the VCO 45 to increase so that the binary count generated by the counter 47 is advanced more rapidly until the proper phase relationship is regained.

If the binary count generated by the counter 25 begins to lead with respect to the phase of the outputs of the ac integrators 33*a–c*, then the average outputs of the phase comparators 35*a–c* and the output of the summing junctions 37 and 39 become negative, causing the output voltage of the error integrator 41 and the frequency of the VCO 45 to decrease so that the binary count generated by the counter 47 advances less rapidly until the proper phase relationship is regained.

When the motor is rotating in the opposite direction, the phase locked loop 27 operates in a similar manner in the opposite sense to adjust the counting rate of the counter 47 to bring the multi-phase current reference signal into phase lock with the output of the PMG integrators 33*a–c*.

The speed of the motor 3 is controlled by a speed feedback loop 65 which includes a magnitude/dc converter 67 which generates a speed feedback signal from the three-phase output from the PMG 31. This speed feedback signal is filtered in a low pass filter 69 and compared to a speed reference signal in summing junction 71 to generate a speed error signal which is applied to the current reference generator 11 to control the magnitude of the current reference signal used as a set point for the converter 5. By reducing the magnitude of the current when the desired speed is reached, the torque is reduced as needed to match the total mechanical loading.

The synchronous drive 1 as described to this point is disclosed and claimed in the above identified related application. With this basic control scheme, the current is phase-locked with respect to stator emf at an angle determined by the alignment of the PMG 31 on the rotor 29. The reference generator 11 stores 256 sets of ROM look-up tables to provide evenly displaced sets of reference waveforms so that using the DIP switches 73, the reference can be aligned to within 1.41 electrical degrees to calibrate the system. When aligned to produce maximum torque at low speeds, the performance of the ac drive 1, as described to this point, is essentially similar to that shown in FIG. 1.

Figure 4:
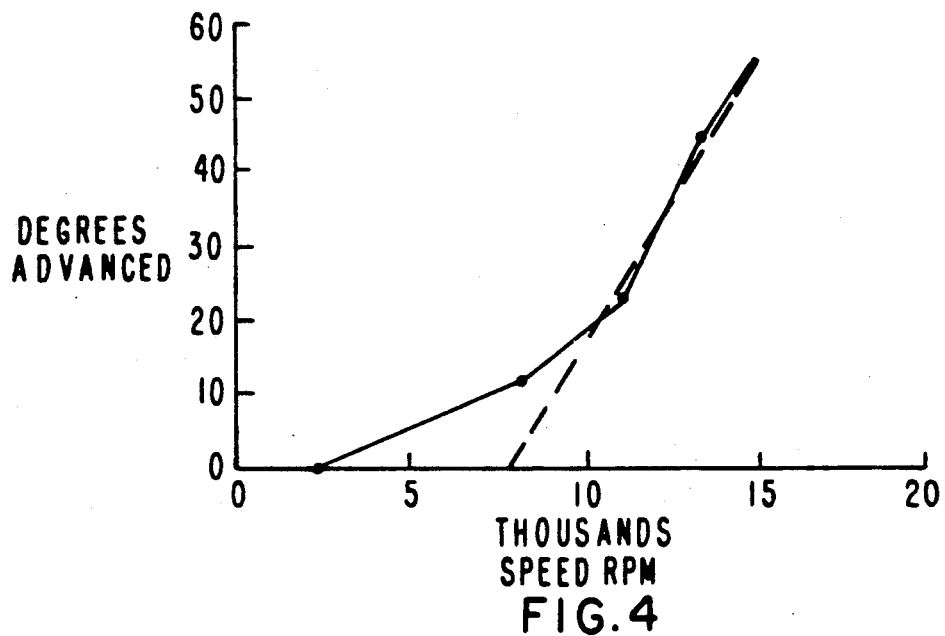
FIG. 4 is a graph showing phase angle advance versus speed for the ac drive of FIG. 3.
Figure 5:
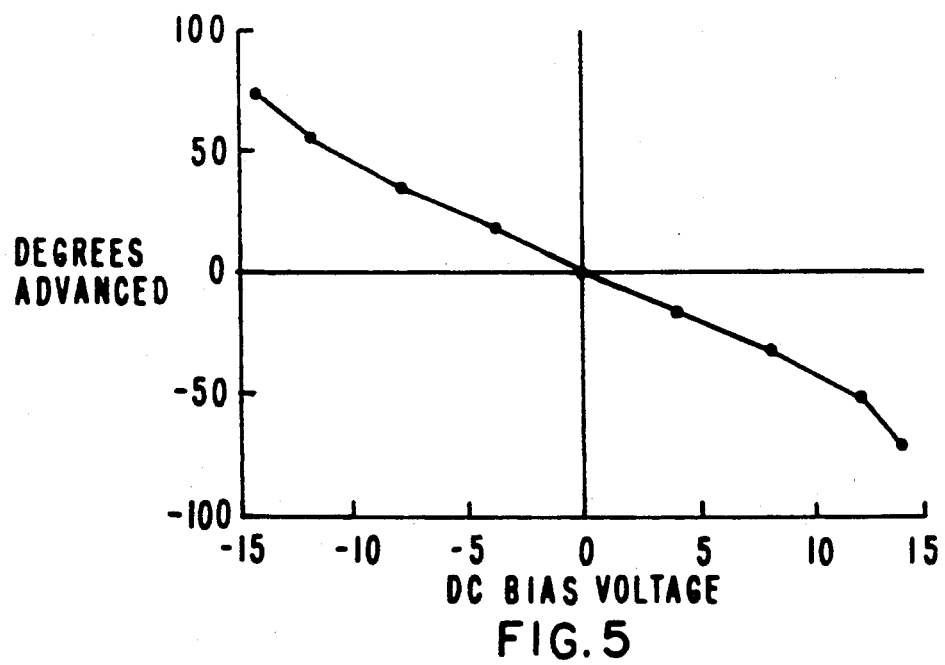
FIG. 5 is a graph showing the effect of biasing a phase locked loop which forms part of the drive of FIG. 3.

In order to determine the optimum alignment as a function of speed, a series of tests were made at incremental angle settings selected using the DIP switches 73. A graph showing alignment angle versus speed, as required to obtain maximum torque, is shown in FIG. 4. This characteristic is fairly linear at higher speeds where the torque is more sensitive to changes in phase. Therefore, a straight line approximation based upon the slope at the upper end of this graph, as shown by the dashed line in FIG. 4, forms a good basis for providing automatic phase advancing of the stator current. An automatic torque angle versus speed optimizer 75 is added to the ac drive 1 of FIG. 3 to automatically advance the phase of the current reference generated by the reference generator 11 to achieve maximum torque at low speed and in the extended range above the speed at which maximum output voltage on the inverter 5 is reached. The automatic torque angle versus speed optimizer 75 includes a speed to dc converter 77 which generates a speed signal from the three-phase position signal generated by the PMG 31. This speed to dc converter can be either a magnitude to DC or a frequency to dc converter. The speed signal is applied to a speed biasing shaper 79 which generates a speed bias signal which is added to the total phase error signal in the phase locked loop 27 in the summing junction 39. This bias signal shifts the phase angle at which the multi-phase current reference signal is phase locked to the PMG position signal. The relationship between bias voltage and the shift in phase of the PLL 27 is fairly linear when the bias varies about zero. A graph showing phase advance versus bias voltage is shown in FIG. 5.

Figure 6:
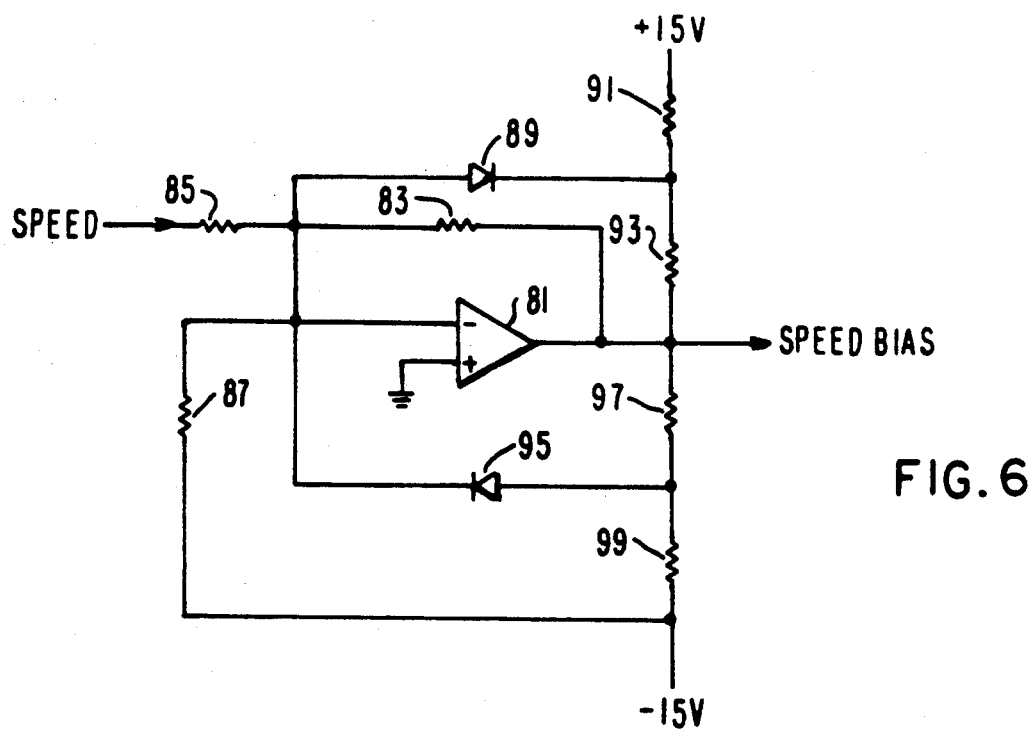
FIG. 6 is a schematic diagram of a circuit generating a speed bias profile for the ac drive of FIG. 3.

A suitable circuit for generating the required speed bias profile is shown in FIG. 6. A dc speed signal from the speed/dc converter 77 is applied to the inverting input of a linear amplifier 81. The slope of the profile is set by the relative values of the feedback resistor 83 and input resistor 85. Resistor 87 provides an offset bias for the profile. The profile is clamped at high speeds by the combination of the clamping diode 89 and the voltage divider formed by the resistors 91 and 93. For low speeds, the bias voltage is clamped by the clamping diode 95 and the voltage divider formed by the resistors 97 and 99.

Figure 7:
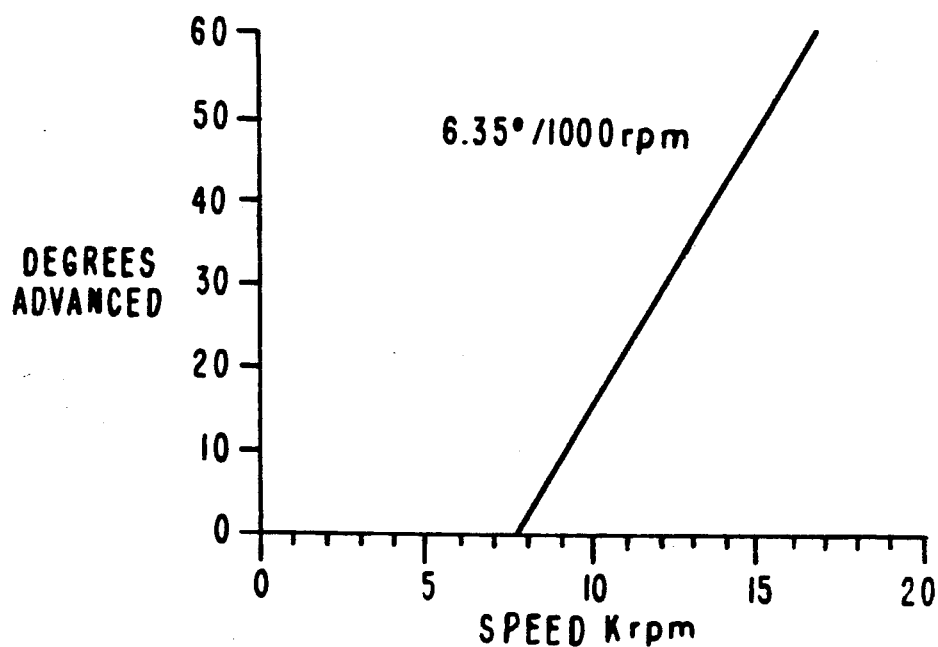
FIG. 7 is a graph of phase angle advance versus speed for an exemplary embodiment of the ac drive of FIG. 3.
Figure 8:
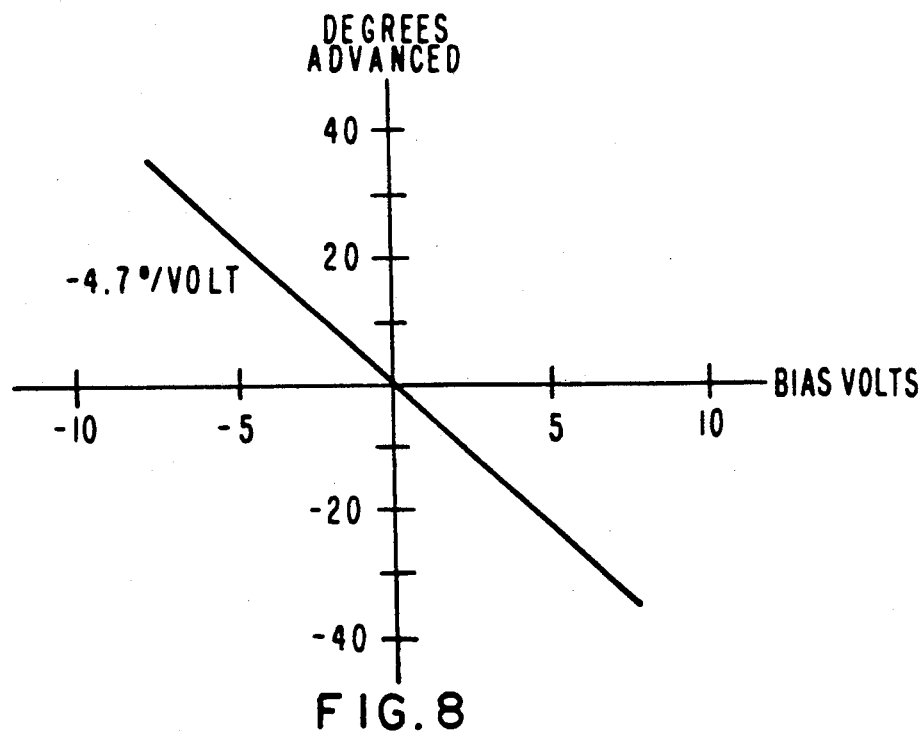
FIG. 8 is a graph illustrating the sensitivity of the phase locked loop of the exemplary embodiment of the ac drive of FIG. 3.
Figure 9:
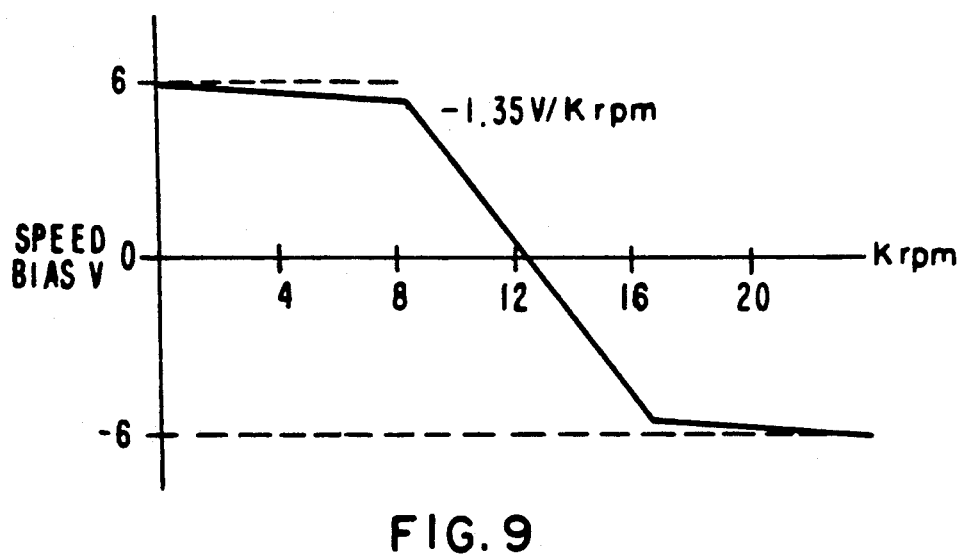
FIG. 9 is a graph of a speed bias profile generated by the circuit of FIG. 6 for the exemplary embodiment of the ac drive of FIG. 3.

Calibration of the speed bias amplifier 81 can be understood by reference to the following example. Consider an ac drive 1 which is to operate at maximum torque up to 17,500 rpm. Graphs showing the required advance, the sensitivity of the PLL 27 and the speed bias profile are shown in FIGS. 7, 8, and 9, respectively. The dc speed signal from the speed/dc converter 77 is provided with a sensitivity of 0.5 volts per 1,000 rpm. To obtain maximum torque, the phase of the current reference needs to be advanced by 6.35 degrees/1,000 rpm when above 7,500 rpm. Because there is no need to maximize torque above 17,500 rpm, the speed bias signal will be clamped, and the major advance will be centered at 12,500 rpm. To obtain a response of 6.35 degrees per 1,000 rpm, the bias signal requires a slope of 1.35 V/1,000 rpm. Because the clamping begins at about 5.6 volts, the major part of the phase advance will occur between 8,352 and 16,648 rpm. Because the speed bias signal is offset, alignment of the PMG 31 must be adjusted so that the current reference is phased for maximum torque at very slow speed.

Figure 10:
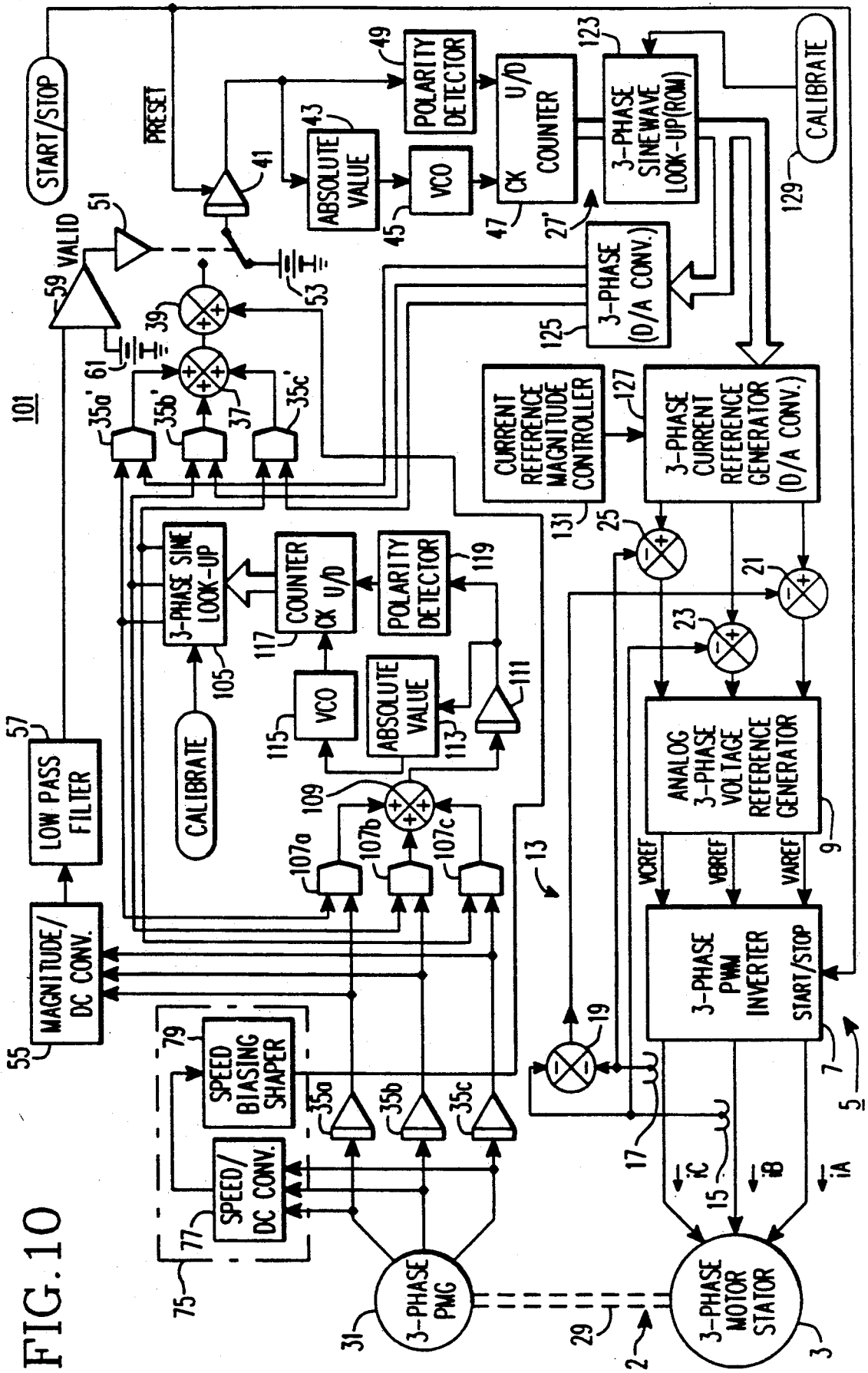
FIG. 10 is a schematic circuit diagram of an ac drive in accordance with another embodiment of the invention.

A second synchronous drive 101 in accordance with another embodiment of the invention is illustrated in FIG. 10. Components in the drive 101 which are common with the components of the drive 1 are given like reference characters. Generally, the PMG's 31 are not precision devices so that the magnitude of the PMG signals for different units could vary by a considerable amount. This variation in the magnitude of the PMG speed signal for different units would require individual fine tuning of the circuit of FIG. 3 to provide the appropriate phase angle between the position signal and the multi-phase reference current generated by the reference generator 11. In order to preclude this necessity for separate adjustment of each installation, the ac drive 101 of FIG. 10 incorporates an additional phase locked loop 103 which generates a digital three-phase speed reference waveform of constant magnitude from three-phase sign look-up tables stored in a reference waveform generator 105. This reference waveform of constant magnitude is phase locked to the output of the ac integrators 35a–35c in the additional phase locked loop 103. The phases of the reference position signal are compared with the integrated PMG signals in phase comparators in the form of multiplying digital to analog converters 107a–107c to generate individual phase errors which are summed in summing junction 109 to generate a total phase error signal. As in the case of the PLL 27, the total phase error signal is integrated by error integrator 111 to produce an integrated total error signal the magnitude of which, as determined by the absolute value circuit 113, as applied to a VCO 115 which generates a variable frequency pulse signal with a frequency determined by the magnitude of the integrated total error signal. The pulses of this variable frequency signal are counted by a counter 117 in a direction determined by the polarity detector 119 to generate a binary shaft position signal which is applied to the reference waveform generator 105 to produce the binary rotor position signal with constant magnitude. DIP switches 121 on the waveform reference generator 105 permit the selection of one of a set of 256 three-phase sign look-up tables for calibration of the digital position signal relative to shaft position.

The PLL 27' is modified from the PLL 27 in the ac drive 1 of FIG. 3 in that the reference signals which are fed back for comparison with the rotor position signal are generated internally in the phase locked loop 27', rather than from the stator currents. Thus, in PLL 27' the binary encoded reference angle generated by the counter 47 is applied to a waveform generator 123 which is a ROM containing sets of three-phase sign look-up tables. The binary encoded three-phase reference generated by 123 is converted to a set of analog reference signals by the three-phase digital to analog converter 125. These analog reference signals are compared with a three-phase digital position signal in the phase comparators 35a'–35c' which are multiplying digital to analog converters. The binary encoded three-phase reference signal from the waveform generator 123 is also applied to a three-phase current reference generator in the form of digital to analog converter 127 to generate the analog three-phase stator current reference signals which serve as the reference for the power converter 5. The PLL 27' can be calibrated to compensate for misalignment of the PMG by DIP switches 129 on the waveform generator 123. In the system 101, open loop control of the stator current magnitudes is provided by a current reference magnitude controller 131 which controls the magnitude of the three-phase analog current reference signal generated by the reference generator 127. Alternatively, the feedback speed control provided by the speed feedback loop 65 in the system 1 of FIG. 3 could be applied to the ac drive 101.

From the above, it will be apparent that the automatic torque optimizing circuitry provided by the invention can easily be tailored to fit the characteristics of a particular machine and inverter. While it is advantageous to utilize a PMG position sensor where available, the techniques described can be implemented with a PLL based upon inputs from the stator emf or from different types of shaft position sensing devices. For very high speed drive, a machine with a permanent magnet rotor could be used.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. Apparatus for optimizing torque in an electric motor having a rotor and a multi-phase stator winding, said apparatus comprising:
   position sensing means generating a position signal representative of instantaneous rotor angular position;
   reference signal generating means responsive to said position signal generated by said position sensing means to generate a set of multi-phase reference signals having a predetermined phase angle with respect to said instantaneous rotor angular position;

power converter means responsive to said set of multi-phase reference signals generated by said reference signal generating means for generating a multi-phase stator current in said multi-phase stator winding at said predetermined phase angle with respect to said instantaneous rotor position;

speed signal generating means generating a speed signal representative of rotational speed of said rotor; and the improvement comprising phase angle adjusting means responsive to said speed signal generated by said speed signal generating means for adjusting said predetermined phase angle of the set of multi-phase reference signals generated by said reference signal generating means with respect to said instantaneous rotor angular position, to adjust torque generated by said motor;

wherein said phase angle adjusting means includes means adjusting said predetermined phase angle to optimize said torque as a function of said rotational speed of said rotor; and wherein said power converter means generates said multi-phase stator current at a predetermined magnitude and at a voltage which increases with increasing rotational speed of said rotor until a maximum voltage is reached, and wherein said phase angle adjusting means maintains said predetermined phase angle at a fixed value until said maximum voltage is reached, and then advances said predetermined phase angle relative to said fixed value for higher rotational speeds of said rotor.

2. The apparatus of claim 1 wherein said phase angle adjusting means advances said predetermined phase angle by an amount needed to maintain said predetermined magnitude of said current at said maximum voltage for a given speed.

3. Apparatus for optimizing torque in an electric motor having a rotor and a multi-phase stator winding, said apparatus comprising:

position sensing means generating a position signal representative of instantaneous rotor angular position;

reference signal generating means responsive to said position signal generated by said position sensing means to generate a set of multi-phase reference signal having a predetermined phase angle with respect to said instantaneous rotor angular position;

power converter means responsive to said set of multi-phase reference signals generated by said reference signal generating means for generating a multi-phase stator current in said multi-phase stator winding at said predetermined phase angle with respect to said instantaneous rotor position;

speed signal generating means generating a speed signal representative of rotational speed of said rotor; and the improvement comprising phase angle adjusting means responsive to said speed signal generated by said speed signal generating means for adjusting said predetermined phase angle of the set of multi-phase reference signals generated by said reference signal generating means with respect to said instantaneous rotor angular position, to adjust torque generated by said motor;

wherein said position sensing means generates a multi-phase position signal, wherein said reference signal generating means comprises a phase locked loop generating said set of multi-phase reference signals phase locked to said multi-phase position signal at said predetermined phase angle, and wherein said phase angle adjusting means comprises means applying a bias to said phase locked loop to adjust said predetermined phase angle.

4. The apparatus of claim 3 wherein said phase locked loop comprises means generating a phase error signal representing a difference in phase between said multi-phase position signal and said set of multi-phase reference signals, integrating means integrating said phase error signal to generate an integrated phase error signal, and means generating from said integrated phase error signal said set of multi-phase reference signals with said predetermined phase angle having a value which drives said phase error signal towards zero, and wherein said bias applying means comprises means adding a bias signal to said phase error signal to generate a biased phased error signal which is integrated by said integrating means, whereby said bias signal adjusts the value of said predetermined phase angle at which said set of multi-phase reference signals are phase locked to said speed signal.

5. The apparatus of claim 4 wherein said phase angle adjusting means includes means adjusting said predetermined phase angle to optimize the torque as a function of said rotational speed of said rotor.

6. The apparatus of claim 5 wherein said power converter means generates said multi-phase stator current at a predetermined magnitude and at a voltage which increases with increasing rotational speed of said rotor until a maximum voltage is reached, and wherein said phase angle adjusting means maintains said predetermined phase angle at a fixed angle until said maximum voltage is reached, and then advances said predetermined phase angle relative to said fixed angle by an amount needed to maintain said predetermined magnitude of current at said maximum voltage for higher rotational speeds.

7. The apparatus of claim 4 wherein said bias applying means includes said speed signal generating means generating a speed signal from said position signal.

8. The apparatus of claim 7 wherein said bias applying means further includes means storing a bias versus speed profile and means generating said bias signal from said bias versus speed profile as a function of said speed signal.

9. The apparatus of claim 3 wherein said position sensing means includes means integrating said multi-phase position signal to generate an integrated multi-phase position signal and wherein said phase locked loop generates said set of multi-phase reference signals phase locked to said integrated multi-phase position signal.

10. The apparatus of claim 3 wherein said position sensing means comprises means generating a multi-phase sensed position signal, and an additional phase locked loop generating said multi-phase position signal phase locked to said multi-phase sensed position signal, said multi-phase position signal having substantially constant magnitude.

11. The apparatus of claim 10 wherein said position sensing means includes integrating means integrating said sensed position signal to generate an integrated sensed position signal and wherein said additional phase locked loop generates a multi-phase integrated position signal phase locked to said integrated sensed position signal, and wherein said first mentioned phase locked loop generates said set of multi-phase reference signals phase locked to said multi-phase integrated position signal.

* * * * *